Oct. 8, 1957   D. T. SMITH   2,809,276
PROCESS OF WELDING TUBES TO PLATES
Filed Oct. 10, 1955

INVENTOR
DAVID T. SMITH

Paul O. Pippel
ATTORNEY ated Oct. 8, 1957

2,809,276

PROCESS OF WELDING TUBES TO PLATES

David T. Smith, Chicago, Ill., assignor to International Harvester Company, a corporation of New Jersey Application October 10, 1955, Serial No. 539,353

4 Claims. (Cl. 219—107)

This invention relates to a process of making a manufactured article such as an evaporator, heat exchanger, or similar device wherein one or more tubes are connected to a sheet article which supports the tubes. This invention also relates to an article of manufacture in the form of a tubular conduit which is supported on metal sheeting, the conduit having a passage for conveying fluids.

In the manufacture of certain articles such as evaporators, heat exchangers, etc., it is generally desirable to weld a plurality of tubes to a metal sheet which acts to support the tubes and which also functions in heat exchange relation. Such tubing when fastened to the sheet generally conducts suitable refrigerant gases and various liquids which serve to accomplish the desired purposes. In the proposed manufacture of welding tubing to flat sheet, upper and lower welding electrodes are utilized. The type of welding accomplished is generally termed "resistance" welding and the electrodes are in roller form; the lower electrode also acting as a support for the tube and sheet to be welded, and the upper electrode exerting a downward pressure on the tube. During the process of resistance welding of tubes to flat sheet metal the tubes generally collapse or become distorted because of the pressures and heat necessary to accomplish proper resistance welding. This is undesirable since the final product must be free of the distortions which can result due to the pressure and heat of the electrodes. It is a prime object of this invention therefore to provide an improved process for welding tubing to sheet metal, the tubing being constructed in a manner wherein the process of welding will not in any way damage or crush the tubing due to the electrode pressures which may be utilized.

A still further object of this invention is to provide an improved article of manufacture such as may be used in connection with evaporators, condensers, etc., the article including a tube having thick wall portions and relatively thinner wall portions, the thick wall portions extending in a direction perpendicular to the plane of the sheet to which the tube is welded.

A still further object is to provide an improved process for welding round tubing to flat metal sheet, the process including the provision of tubing having an eccentrically disposed passage to provide thickened side wall sections which adequately support the tube against distortion during the high welding pressures and heat which are exerted by the electrodes.

These and further objects will become more readily apparent from a reading of the description when examined in connection with the accompanying sheet of drawings.

Figure 1:
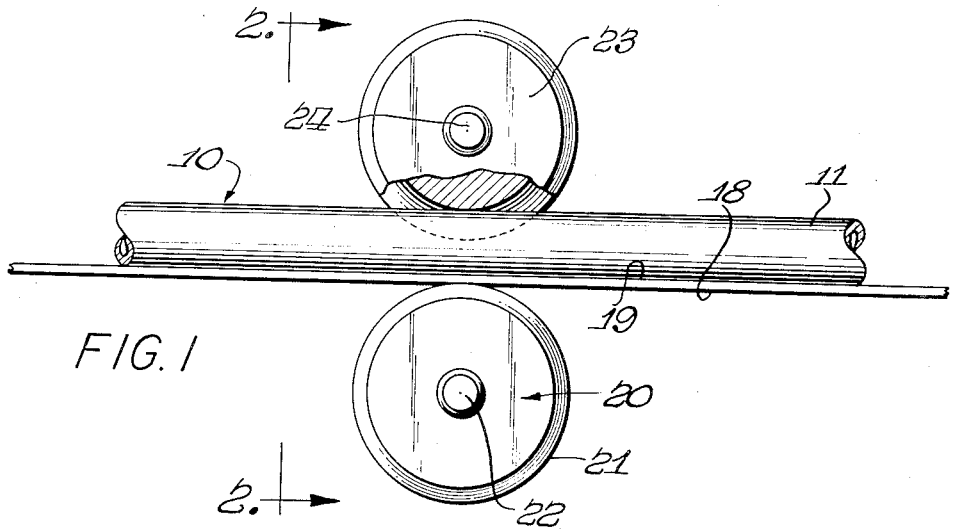
Figure 1 is a side elevational view showing a process of welding a tube to a flat sheet by means of resistance welding.
Figure 2:
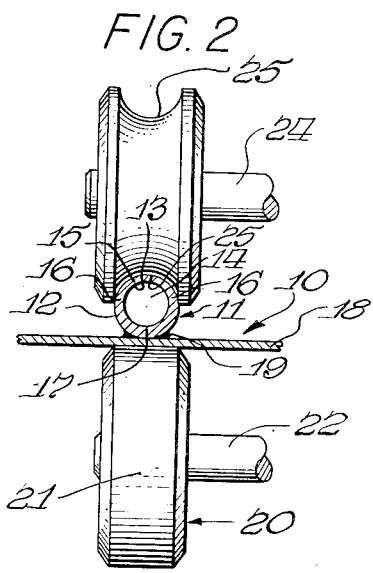
Figure 2 is a cross sectional view taken along the line 2—2 of Figure 1.

Referring now particularly to Figures 1 and 2, an article of manufacture is generally designated by the reference character 10. The article of manufacture 10 may be an assembly portion of an evaporator, condenser, or similar unit wherein a flat metal sheet is permanently connected to a tube which is disposed to transmit fluids and gases. The article of manufacture 10 comprises a tube 11 having a round outer wall 12 and an inner wall 13. The inner wall 13 provides a passage 14. The passage 14, as indicated in Figures 1 and 2, is eccentrically disposed relative to the axis of the outer wall 12. This eccentric disposition of the passage 14 provides in the outer wall a relatively thin upper portion 15 and relatively thicker side portions 16. The tube 11 also includes a lower wall portion 17, the same also having an increased thickness with respect to the other wall portions. A metal sheet 18 is connected by means of resistance welding to the tube 11 by means of a weld designated at 19.

As best shown in Figures 1 through 4 a lower electrode is designated at 20, the said electrode 20 having a flat peripheral surface 21 adapted to engage the underneath side of the sheet 18. An upper electrode 23 is positioned in vertical alignment with respect to the electrode 20 both of said electrodes being of the wheel type, the upper electrode including a shaft 24 and the lower electrode including a shaft 22, the said shafts being supported in conventional manner on a resistance welding machine, not shown. The electrical connections or the pressure connections of the electrodes 20 and 23 will not be described since they form no part of the present invention and resistance roller electrodes of the type are conventional. The upper electrode 20 includes an arcuate surface 25 which, as shown in Figure 2, fits the outer peripheral surface or outer wall 12 of the tube 11 in complemental relation.

In the practice of the process the tube 10 is placed on top of the metal sheet 18 and the parts are positioned between the electrodes 20 and 23 (suitably connected to a welder) and pressure is applied by the upper electrode 23 against the tube and sheet which is supported by the lower electrode 20. The tube is then welded by resistance methods to the flat metal sheet as indicated by the weld at 19. In view of the fact that the tube has relatively strong side walls 16, as indicated, it serves to make for a relatively rigid construction which does not collapse despite the welding pressures which may be exerted during the welding operation. Thus as the material to be welded is fed between the rollers 20 and 23 welding of the tube 11 to the plate 18 takes place.

Figure 3:
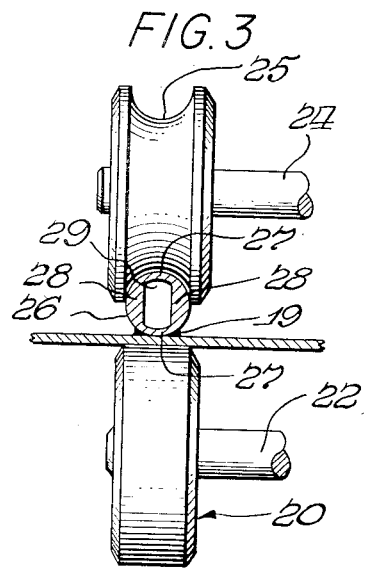
Figure 3 is a cross sectional view similar to Figure 2, the view showing a welding operation wherein a modified form of tubing is utilized.
Figure 4:
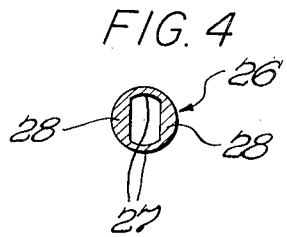
Figure 4 is a cross sectional view through a modified tube having a particular shape.

In the modification shown in Figures 3 and 4 the process is identical. The electrodes 20 and 23 are also identical and the only change is in the shape of the tubing. The tubing here is designated at 26 and it comprises laterally spaced thin walls 27 and laterally spaced side walls 28 of relatively thicker cross sectional dimension. The walls 27 and 28 are of course integral and are provided with a passage 29. In this modification the thick walls 28 serve to support the tube against collapse during high pressures exerted by the roller or wheeled electrodes.

Thus the tubes are amply supported by the particular wall construction disclosed and with the sheet an improved article combination is apparent.

Thus it can be seen that the objects of the invention have been fully achieved and it must be understood that changes and modifications may be made without departing from the spirit of invention as disclosed or the scope as defined in the appended claims.

What is claimed is:

1. A process of welding tubing to sheet metal comprising placing a tube on a flat sheet, the tube having a passage disposed eccentrically with respect to the axis of the tube to provide a wall having relatively thick lower and side wall portions and a relatively thin upper wall portion, positioning the lower wall portion in contact with said sheet with said thick side walls substantially perpendicular to said sheet, applying a first wheel electrode having a flat circumferential surface to a portion of the sheet opposite said tube, applying a second wheel electrode to said tube, the second wheel electrode having a curved circumferentially extending peripheral surface in complemental engagement with said upper wall portion, and applying pressure to said electrodes simultaneously with electrical current whereby during relative movement of said electrodes, tube and sheet, the tube is welded to said sheet.

2. A process of welding tubing to sheet metal comprising placing a round tube on a flat sheet, the tube having a passage disposed offset with respect to the axis of the tube to provide a wall having relatively thick side wall portions, a relatively thin upper wall portion, and a lower wall portion positioning said tube with the lower wall portion in contact with said sheet and with said side walls in substantially perpendicular relation to said sheet, applying a first wheel electrode with a peripheral surface against a portion of the sheet opposite said tube, applying a second wheel electrode to said tube, the second wheel electrode having a curved circumferentially extending peripheral surface in complemental engagement with said upper wall portion, and applying pressure to said electrodes simultaneously with electrical current whereby during relative movement of said electrodes, tube and sheet, the tube is welded to said sheet.

3. A process of resistance welding tubing to a metal sheet, the tube having a wall with substantially thicker side wall portions than the other portions of the tube, comprising the steps of positioning the tube on the metal sheet with the thicker walls placed substantially perpendicular to the plane of the metal sheet, applying a first electrode to one side of the metal sheet, applying a second electrode to the tube, applying an electrical current to said electrodes, and simultaneously moving said electrodes toward each other to apply pressure to said tube and metal sheet whereby the tube is welded to said metal sheet.

4. A process of resistance welding tubing to a metal sheet, the tube having a wall with substantially thicker side wall portions than the other portions of the tube, comprising the steps of positioning the tube on the metal sheet with the side walls extending laterally with respect to the plane of the sheet, applying a first electrode to one side of the metal sheet, applying a second electrode to the tube, applying an electrical current to said electrode, and simultaneously moving said electrodes toward each other to apply pressure to said tube and metal sheet whereby the tube is welded to said metal sheet.

References Cited in the file of this patent

UNITED STATES PATENTS

| | | |
|---|---|---|
| 2,306,772 | Benson | Dec. 29, 1942 |
| 2,473,633 | Brown | June 21, 1949 |
| 2,473,634 | Brown | June 21, 1949 |
| 2,612,351 | Janos | Sept. 30, 1952 |
| 2,646,971 | Raskin | July 28, 1953 |

FOREIGN PATENTS

| | | |
|---|---|---|
| 554,389 | Great Britain | July 1, 1943 |